(12) United States Patent
Brink

(10) Patent No.: US 6,382,561 B1
(45) Date of Patent: May 7, 2002

(54) TRAILING EDGE WEDGE FOR AN AIRCRAFT WING

(75) Inventor: Bernard Kock am Brink, Hamburg (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/450,175

(22) Filed: Nov. 29, 1999

(30) Foreign Application Priority Data

Nov. 27, 1998 (DE) .......................... 198 54 741

(51) Int. Cl.$^7$ ............................ B64C 3/00; B64C 23/00
(52) U.S. Cl. ..................... 244/35 R; 244/215
(58) Field of Search ................... 244/35 R, 36, 244/219, 199, 200, 130, 215

(56) References Cited

U.S. PATENT DOCUMENTS 4,311,289 A * 1/1982 Finch ..................... 244/130 X
4,542,868 A   9/1985 Boyd ........................ 244/198
4,867,396 A   9/1989 Wainfan ..................... 244/215
5,518,210 A * 5/1996 Friberg ...................... 244/215

OTHER PUBLICATIONS

"Jane's All The World's Aircraft", published in Janes Yearbooks, 1976–1977 Edition, London, England.

* cited by examiner

*Primary Examiner*—Robert P. Swiatek
(74) *Attorney, Agent, or Firm*—W. F. Fasse; W. G. Fasse

(57) ABSTRACT

A trailing edge wedge for an aircraft wing is attached to a bottom downwardly facing wing surface along the trailing edge of the wing so that an inner edge wedge surface is fully covered by the bottom wing surface. When the edge wedge is secured to a bottom surface of a wing, the wedge tip faces in the flight direction. The inner edge wedge surface and an opposite outer edge wedge surface enclose a wedge angle within the range of about 5° to about 20°. The edge wedge compensates for asymmetric aircraft characteristics due to unavoidable manufacturing tolerances.

9 Claims, 2 Drawing Sheets

TRAILING EDGE WEDGE FOR AN AIRCRAFT WING

PRIORITY CLAIM

This application is based on and claims the priority under 35 U.S.C. § 119 of German Patent Application 198 54 741.2, filed on Nov. 27, 1998 the entire disclosure of which is incorporated herein by reference.

FIELD OF THE INVENTION

The invention relates to a wedge element for attachment to a bottom surface of an aircraft wing directly along the trailing edge of the wing whereby the wedge element referred to herein as edge wedge preferably extends in parallel to the trailing edge of the wing.

BACKGROUND INFORMATION

U.S. Pat. No. 4,542,868 (Boyd) discloses a wedge-shaped structural component for attachment to the bottom surface of an aircraft wing profile near or along the trailing edge of the aircraft wing. The purpose of such a conventional wedge shaped structural component is to improve the lift coefficient and to reduce the drag during cruising speeds. The conventional wedge-shaped component has a downward height within the range of 0.5% to 1.5% of the local chord of the aircraft wing. The downwardly facing or outer surface of the conventional wedge component encloses with the chord an angle within the range of 15° to 45°. The conventional wedge component is secured directly along the wing trailing edge or at a distance from the wing trailing edge whereby the distance corresponds up to 1% of the length of the local wing chord. While the conventional wedge component improves the lift coefficient and reduces the drag during cruising flight, it does not provide any compensation for unavoidable structural tolerances and related asymmetric characteristics of the aircraft.

An other publication "Jane's All The World's Aircraft" published in Jane's Yearbooks 1976–77 edition, discloses on pages 31 and 81 single engine propeller aircraft equipped with wings having ailerons secured to the trailing edge of the wing and provided with bail edges. These bail edges on the ailerons are arranged only on one side of the aircraft and produce a counter moment to the rolling moment which is produced by the propeller wake of a single engine aircraft. Asymmetric aircraft characteristics caused by unavoidable structural tolerances are not compensated by such bail edges on the ailerons.

U.S. Pat. No. 4,867,396 (Wainfan) discloses a micro flap trailing edge device for an aircraft wing for improving the lift coefficient and for reducing drag. The flap is a flat plate-like member having a length within the range of about 0.5% to 1.5% of the local chord of the aircraft wing. The plate-like flap forms an angle with the wing chord within the range of 5° to 25°. The purpose of such a micro flap attached to the wing downstream of the trailing edge of the wing is to improve lift without any compensation for aircraft asymmetric characteristics that are due to unavoidable structural tolerances.

OBJECTS OF THE INVENTION

In view of the forgoing it is the aim of the invention to achieve the following objects singly or in combination:

to provide an edge wedge for use in combination with an aircraft wing, particularly only with one of the two wings, whereby the edge wedge is so constructed that any asymmetric aircraft characteristics that are due to the sum of all unavoidable structural tolerances are compensated;

to combine an aircraft wing with an edge wedge, specifically an edge wedge that will counteract aircraft asymmetric characteristics including asymmetric flight characteristics;

to advantageously influence the pressure distribution on the upper surface and the bottom surface of an aircraft wing;

to cause a localized increase of lift on an aircraft wing which compensates for asymmetrical aircraft characteristics by generating a desirable counter rolling moment; and to select the desired counter-rolling moment by correspondingly selecting the width of the compensating edge wedge in the direction of the wing span width or wing length.

SUMMARY OF THE INVENTION

According to the invention the above objects have been achieved by a trailing edge wedge for an aircraft wing which edge wedge is constructed for attachment to the bottom surface of the aircraft wing directly next to and along the trailing edge of the wing and preferably parallel thereto. The edge wedge has a triangular cross-section in a longitudinal chord axis direction of the aircraft wing and points with its wedge tip toward the leading wing edge. The edge wedge has an inner surface for connection directly to the bottom surface of the aircraft wing, an outer edge wedge surface facing downwardly and an end surface facing rearwardly. The outer edge wedge surface has a length in the longitudinal chord direction. When the edge wedge is attached to the bottom wing surface, the trailing wedge end surface is preferably flush with the trailing edge of the wing or within 0.5% of the local wing chord. The inner edge wedge surface that faces the bottom wing surface for connection to the bottom wing surface and the outer edge wedge surface facing away from the wing enclose a wedge angle $\alpha$ within the range of about 5° to about 20°. The angle $\alpha$ is preferably within the range of 5° to less than 17°. Preferably the edge wedge is attached to only one wing of the aircraft for compensating asymmetric aircraft characteristics.

According to the invention there is further provided a combination of an aircraft wing with the present edge wedge. In the combination the inner edge wedge surface is secured directly to the bottom wing surface along the trailing edge of the wing so that the inner edge wedge surface and the bottom wing surface are flush with each other. Moreover, the rearwardly facing wing trailing edge surface and the back end wedge surface of the trailing edge extend preferably in the same plane or within 0.5% of the local wing chord.

In one embodiment of the invention the wedge angle $\alpha$ enclosed by the inner and outer wedge surfaces is equal to the flow-off angle of the wing. In another embodiment the wedge angle differs from the flow-off angle. Preferably the flow-off angle is larger than the wedge angle. Further, in a preferred embodiment the edge wedge length in the direction of the chord axis of the wing is about 1% of the length of the local wing chord. The rearwardly facing back end wedge surface wedge is preferably directly connected to the trailing edge of the wing or within 0.5% of local wing chord and has a height (h) of about 0.1% to 0.3% of the local wing chord.

In the embodiment of the invention, in which the flow-off angle differs from the wedge angle, the outer surface of the edge wedge is curved downwardly whereby the flow-off angle becomes larger than the wedge angle. The flow-off angle may be within the range of up to 60°.

The present edge wedge advantageously influences the pressure distribution on the upper wing surface and the bottom wing surface where the edge wedge is secured to bottom surface of the wing. The present edge wedge functions as a divergent trailing edge of the wing whereby a desirable localized lift increase is achieved which in turn causes a desired counter rolling moment for compensating any asymmetric characteristics of the aircraft or of its flight. Another advantage of the invention is seen in that the desired rolling moment or rather counter-rolling moment can be selected by varying the width of the edge wedge in the direction of the span width or length of the wing to which the edge wedge is attached. Thus, the present edge wedge provides a flexible means for an advantageous compensation not only of asymmetrical characteristics of the aircraft itself that are due to unavoidable structural tolerances but also compensates for asymmetric flight characteristics that may occur unintentionally particularly during cruising flight of an aircraft. The wedge width in the wing span direction is selected according to the desired counter rolling moment.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
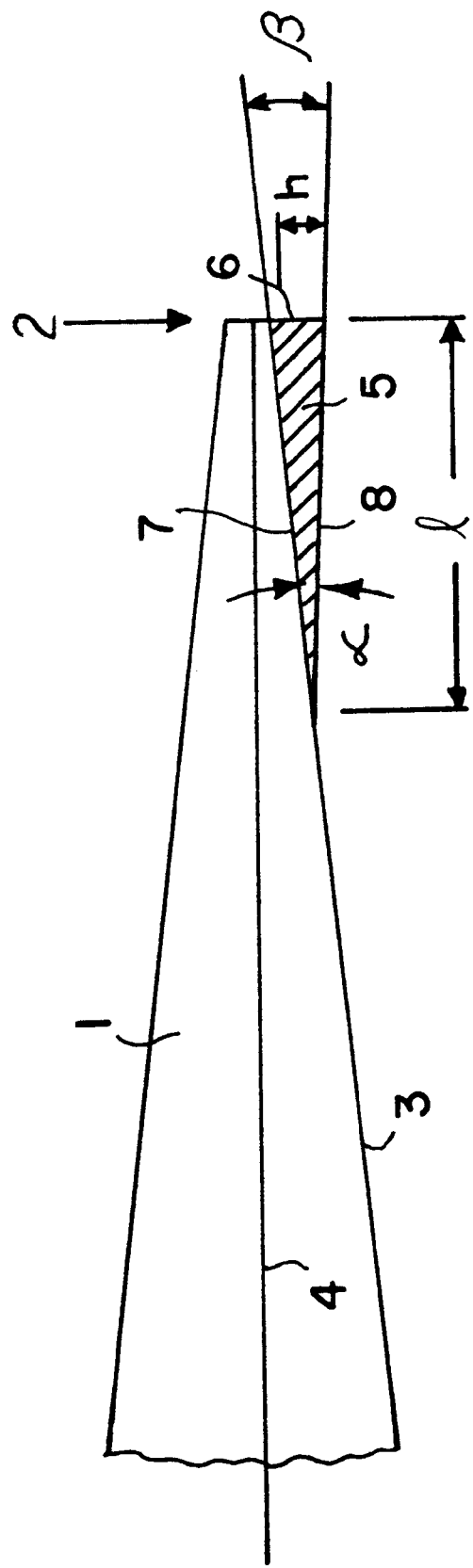
FIG. 1 shows a schematic sectional view through a trailing edge portion of an aircraft wing equipped with an edge wedge according to the invention.

FIG. 1 shows the attachment of an edge wedge 5 according to the invention directly to the bottom surface 3 of an aircraft wing 1 along the trailing edge 2 of the wing. The edge wedge 5 has an inner surface connected to the bottom wing surface 3 and an outer surface 8 facing downwardly. The edge wedge 5 further has a back end wedge surface 6 having a height h which is preferably positioned in the same plane as the trailing edge surface of the wing 1. The edge wedge 5, specifically its bottom surface 8 has a length 1 in the longitudinal chord direction.

A wedge angle α is enclosed between the inner and outer surfaces 7 and 8 of the edge wedge 5. The angle α is also determined by the ratio of the height h to length 1 of the bottom surface 8 of the edge wedge 5. This length 1 is measured in the longitudinal direction of the chord axis 4 of the wing 1 between its leading and trailing edges. The wedge angle α according to the invention is within the range of about 5° to about 20°, preferably less than 17°. In the embodiment of FIG. 1 the wedge angle α is equal to the flow-off angle β at the end of the trailing edge. In such a construction the length 1 of the edge wedge 5 is for example 1% of the local wing chord 4. The height h preferably is within the range of 0.1% to 0.3% of the local wing chord 4.

Figure 2:
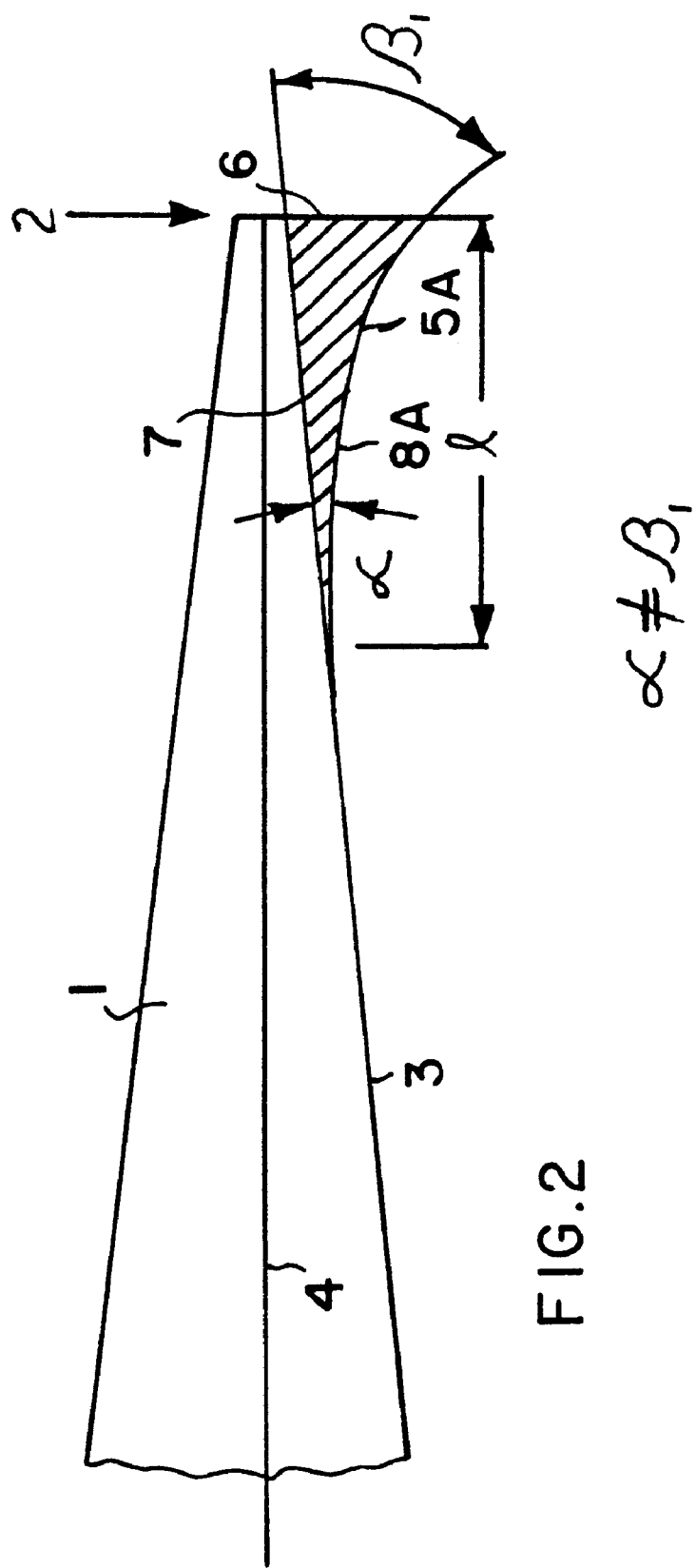
FIG. 2 is a view similar to that of FIG. 1, however with a curved edge wedge outer downwardly facing surface.

FIG. 2 shows an edge wedge 5A having a downwardly facing outer surface 8A with a downwardly extending curvature that increases the flow-off angle $β_1$ so that the wedge angle α is smaller than the flow-off angle $β_1$. The flow-off angle $β_1$ may be 60° at the most.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A trailing edge wedge and aircraft wing, said edge wedge comprising a triangular cross-section in a local chord axis direction of said aircraft wing, an inner edge wedge surface connected to a bottom surface of said aircraft wing, an outer edge wedge surface facing downwardly when installed and having a length (l) in said local chord axis direction, a back end wedge surface (6) having a height (h), wherein said inner edge wedge surface and said outer edge wedge surface enclose a wedge angle α within the range of about 5° to about 20°, and wherein said wedge angle α is determined by the ratio of (h) to (l) to satisfy said wedge angle range, wherein said length (l) of said outer edge wedge surface corresponds to about 1% of a local chord length of said aircraft wing, and wherein said height (h) of said back end wedge surface (6) corresponds to about 0.1% to about 0.3% of said local chord length for compensating asymmetric characteristics caused by a sum of structural tolerances of an aircraft.

2. The edge wedge of claim 1, comprising a trailing end flow-off angle (β) equal to said wedge angle (α).

3. The edge wedge of claim 1, wherein said outer edge wedge surface (8A) has a curvature for changing a flow-off angle ($β_1$) of said edge wedge so that said wedge angle (α) is smaller than said flow-off angle ($β_1$).

4. The edge wedge of claim 3, wherein said flow-off angle ($β_1$) does not exceed 60°.

5. A combination comprising an aircraft having two wings, each wing including a leading edge, a trailing edge, a chord axis (4) between said leading edge and said trailing edge, a top wing surface and a bottom wing surface (3), an edge wedge (5, 5A) attached to said bottom wing surface of only one wing of said two wings for compensating asymmetric characteristics caused by a sum of structural tolerances of said aircraft, said edge wedge including a triangular cross-section in the direction of said chord axis (4) of said aircraft wing (1), an inner edge wedge surface (7) directly connected to said bottom surface (3) of said aircraft wing (1), an outer edge wedge surface (8,8A) facing downwardly, said outer edge wedge surface (8,8A) having a length (l) in the direction of said longitudinal chord axis (4), and a back end wedge surface (6) having a height (h), wherein said inner edge wedge surface (7) and said outer edge wedge surface (8,8A) enclose a wedge angle α within the range of about 5° to about 20° whereby said wedge angle α is determined by a ratio of h to l, and wherein said inner edge wedge surface is in direct contact with said bottom wing surface (3) over the entire inner edge wedge surface (7).

6. The combination of claim 5, wherein said trailing edge of said aircraft wing has a trailing edge surface, and wherein said back end wedge surface (6) and said trailing edge wing surface extend in the same plane.

7. The combination of claim 5, wherein said trailing edge of said aircraft wing has a trailing edge surface, and wherein said back end wedge surface (6) and said trailing edge wing surface extends within 0.5% of a local wing chord length.

8. The combination of claim 5, wherein said edge wedge has a length (l) of about 1% of a local wing chord length.

9. A combination comprising an aircraft having two wings, each wing including a leading edge, a trailing edge, a chord axis between said leading edge and said trailing edge, a top wing surface and a bottom wing surface, an edge wedge attached only to one wing of said two wings of said aircraft for compensating asymmetric aircraft characteristics and asymmetric aircraft flight characteristics caused by a sum of structural tolerances of said aircraft.

* * * * *